US010814748B2

(12) United States Patent
Akaike et al.

(10) Patent No.: US 10,814,748 B2
(45) Date of Patent: Oct. 27, 2020

(54) VEHICLE SEAT STRUCTURE

(71) Applicant: TOYOTA BOSHOKU KABUSHIKI KAISHA, Aichi-ken (JP)

(72) Inventors: Fumitoshi Akaike, Aichi-ken (JP); Hiroshi Tsuji, Aichi-ken (JP); Keisuke Toda, Aichi-ken (JP); Hajime Takagi, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/419,740

(22) Filed: May 22, 2019

(65) Prior Publication Data
US 2019/0359086 A1 Nov. 28, 2019

(30) Foreign Application Priority Data
May 23, 2018 (JP) .................................. 2018-098615

(51) Int. Cl.
*B60N 2/12* (2006.01)
*B60N 2/14* (2006.01)

(52) U.S. Cl.
CPC .................. *B60N 2/12* (2013.01); *B60N 2/14* (2013.01)

(58) Field of Classification Search
CPC .................................... B60N 2/12; B60N 2/14
See application file for complete search history.

(56) References Cited

U.S. PATENT DOCUMENTS

| | | | | |
|---|---|---|---|---|
| 7,399,035 B2* | 7/2008 | Kusanagi | ............... | B60N 2/245 296/65.07 |
| 8,033,605 B2* | 10/2011 | Miura | ...................... | B60N 2/14 296/65.07 |
| 8,182,014 B2* | 5/2012 | Mabuchi | .................. | B60N 2/01 296/64 |
| 9,669,738 B2* | 6/2017 | Lemay | .................. | B60N 2/0232 |
| 9,718,378 B2* | 8/2017 | Schulz | .................. | B60N 2/0244 |
| 10,040,373 B2* | 8/2018 | Rawlinson | ............... | B60N 2/14 |
| 10,336,216 B2* | 7/2019 | Slungare | .................. | B60N 2/14 |
| 2001/0038223 A1* | 11/2001 | Suga | ..................... | B60N 2/062 296/65.11 |
| 2007/0252424 A1* | 11/2007 | Tomaiwa | ................. | B60N 2/14 297/463.1 |

(Continued)

FOREIGN PATENT DOCUMENTS

JP 2005-289246 10/2005

*Primary Examiner* — Philip F Gabler
(74) *Attorney, Agent, or Firm* — Greenblum & Bernstein, P.L.C.

(57) ABSTRACT

A vehicle seat structure including a first seat and a second seat, wherein the first seat includes: a tilting rotation mechanism configured to connect the first seat with respect to a floor in a manner switchable between a sitting position and a raised position; and a pivoting mechanism configured to pivotably connect the first seat to the floor with the tilting rotation mechanism provided therebetween, and wherein the second seat includes a concave portion configured to reduce interference between the second seat and a forefoot of a sitting occupant of the first seat which is being pivoted in the raised position when the second seat and the first seat are in a positional relationship in which the second seat overlaps, in a plan view, with a pivoting trajectory of the forefoot of the sitting occupant of the first seat which is being pivoted in the raised position.

3 Claims, 9 Drawing Sheets

(56) References Cited

U.S. PATENT DOCUMENTS

| | | | |
|---|---|---|---|
| 2008/0290706 A1* | 11/2008 | Yamada | B60N 2/0745 297/240 |
| 2010/0148555 A1* | 6/2010 | Lung | B60N 2/0232 297/344.14 |
| 2019/0143845 A1* | 5/2019 | Akaike | B60N 2/06 297/240 |

* cited by examiner

VEHICLE SEAT STRUCTURE

CROSS-REFERENCE TO RELATED APPLICATIONS

This application claims priority from Japanese Patent Application No. 2018-098615 filed on May 23, 2018, the entire contents of which are incorporated herein by reference.

TECHNICAL FIELD

The present disclosure relates to a vehicle seat structure. More specifically, the present disclosure relates to a vehicle seat structure including a first seat and a second seat disposed on a floor of a vehicle.

BACKGROUND ART

In related art, in a vehicle seat, a configuration is known in which an entire seat is raised to a front side without changing its shape and is pivoted to an entrance door opening on a vehicle outer side, so as to be switched to a form capable of supporting a person from getting-on and getting-off the vehicle (see, for example, JP-A-2005-289246).

In the related art described above, a rotary hinge used at the time of raising the entire seat is set to a front end lower portion of a seat cushion. As a result, in accordance with rise of the entire seat toward a front side, a seat surface on the front side of the seat cushion greatly falls to a front lower side around the rotary hinge, and a height space for feet when pivoting inside a vehicle interior is narrowed.

SUMMARY

An aspect of the present disclosure has been made to solve the above problem, and an object of the present disclosure is to secure a wide space for feet when a seat is raised and pivoted.

According to an aspect of the disclosure, there is provided a vehicle seat structure including: a first seat and a second seat which are disposed on a floor of a vehicle, wherein the first seat includes: a tilting rotation mechanism configured to connect the first seat with respect to the floor in a manner switchable between a sitting position on the floor and a raised position raised from the sitting position toward a seat front side by rotation about an axis extending in a seat width direction; and a pivoting mechanism configured to pivotably connect the first seat to the floor with the tilting rotation mechanism provided therebetween, and wherein the second seat includes a concave portion configured to reduce interference between the second seat and a forefoot of a sitting occupant of the first seat which is being pivoted in the raised position when the second seat and the first seat are in a positional relationship in which the second seat overlaps, in a plan view, with a pivoting trajectory of the forefoot of the sitting occupant of the first seat which is being pivoted in the raised position.

Accordingly, by pivoting the first seat switched to the raised position, the first seat can be pivoted on the floor at a small rotation radius. In addition, due to the concave portion formed on the second seat, it is possible to secure a wide space for the foot of the sitting occupant when the first seat is pivoted.

DETAILED DESCRIPTION

Embodiments of the present disclosure will be described below with reference to the drawings.

Embodiment 1

<Schematic Configuration of Seat Structure 1>

First, a seat structure 1 (vehicle seat structure) according to Embodiment 1 is described with reference to FIGS. 1 to 9. In the following description, each direction, such as front, rear, upper, lower, left, and right, indicates the respective directions shown in the drawings. A "seat width direction" refers to a left-right direction in each one of a right seat 10 and a left seat 20 described later.

Figure 1:
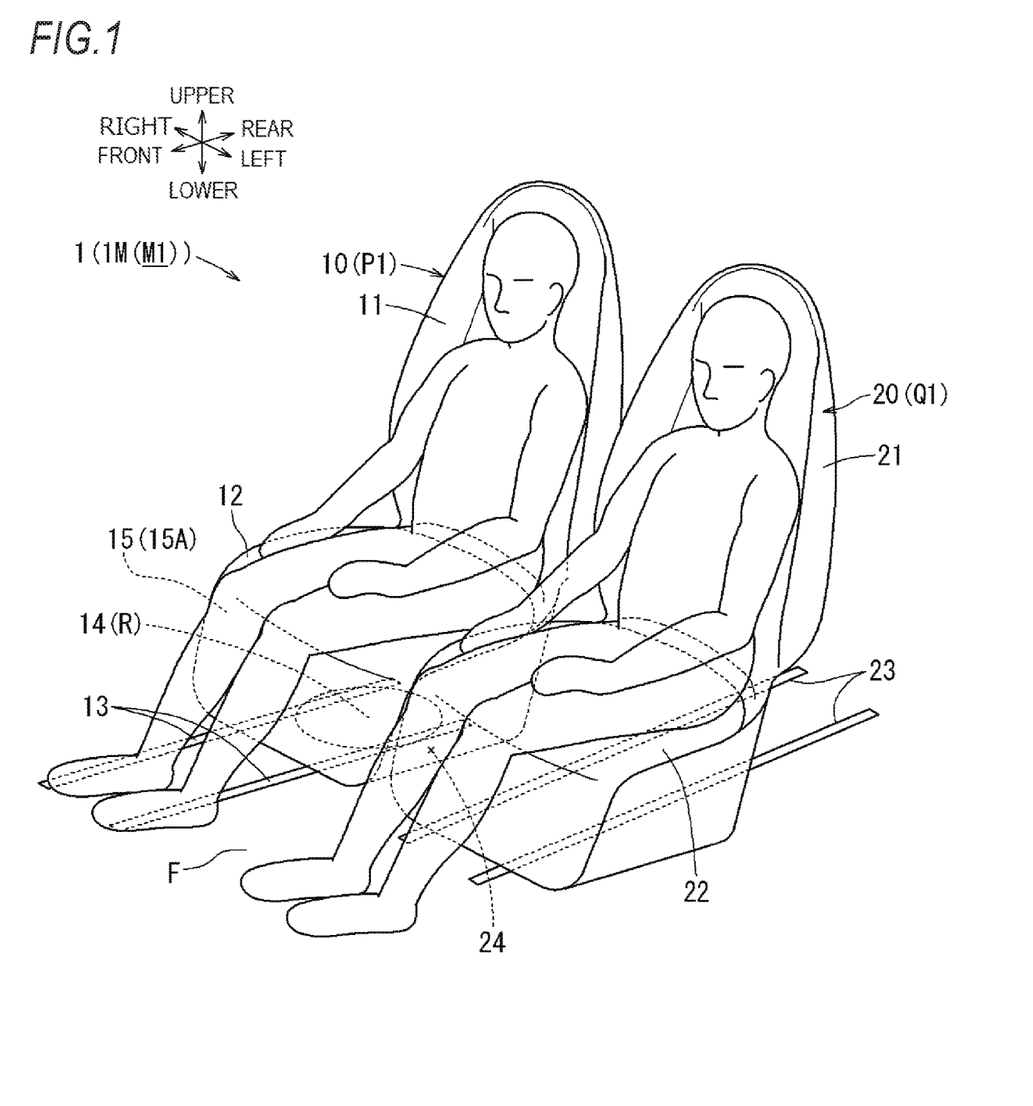
FIG. 1 is a perspective view showing a schematic configuration of a vehicle seat structure of Embodiment 1.
Figure 2:
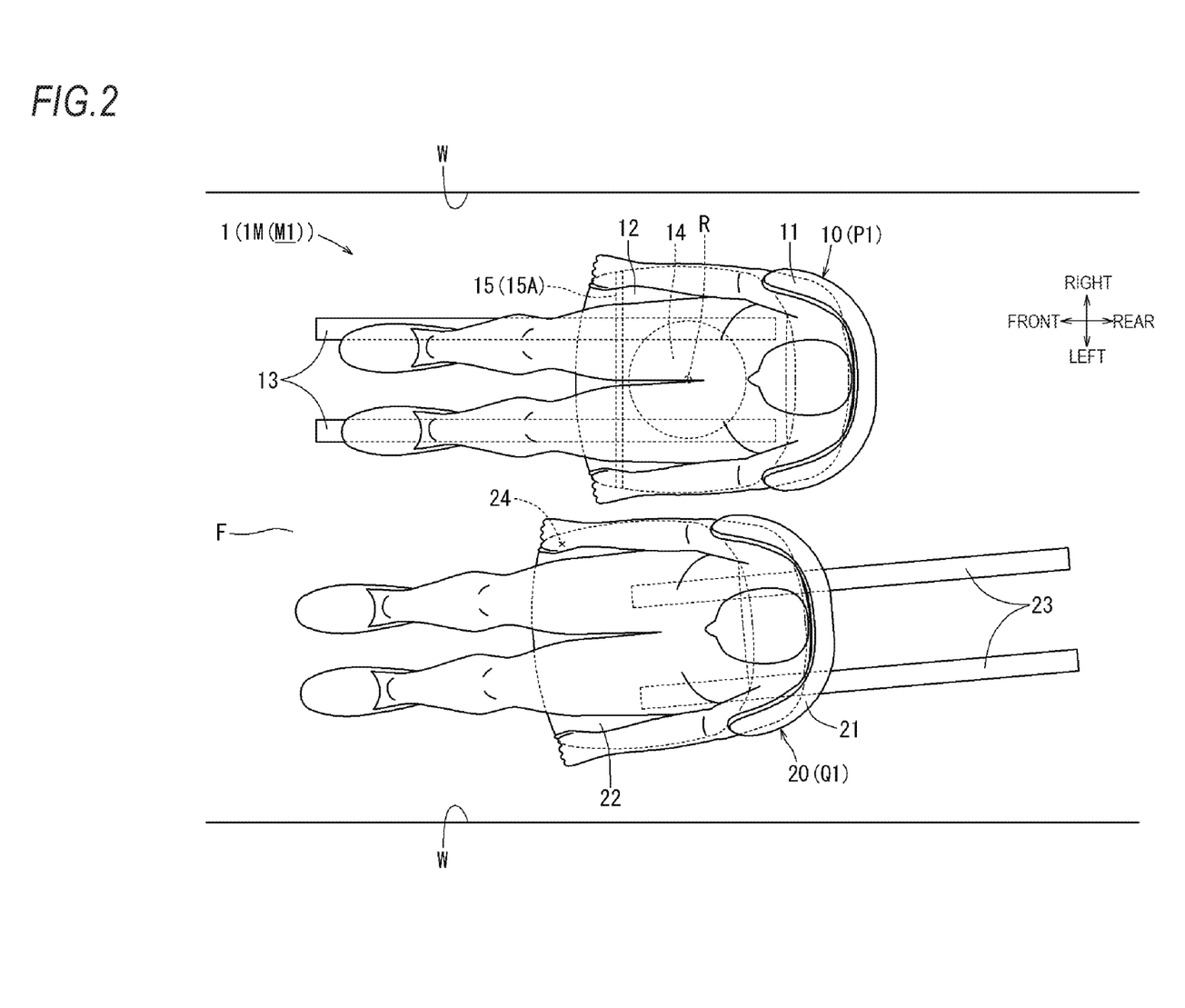
FIG. 2 is a plan view of FIG. 1 showing a sitting state in a lateral arrangement mode.
Figure 5:
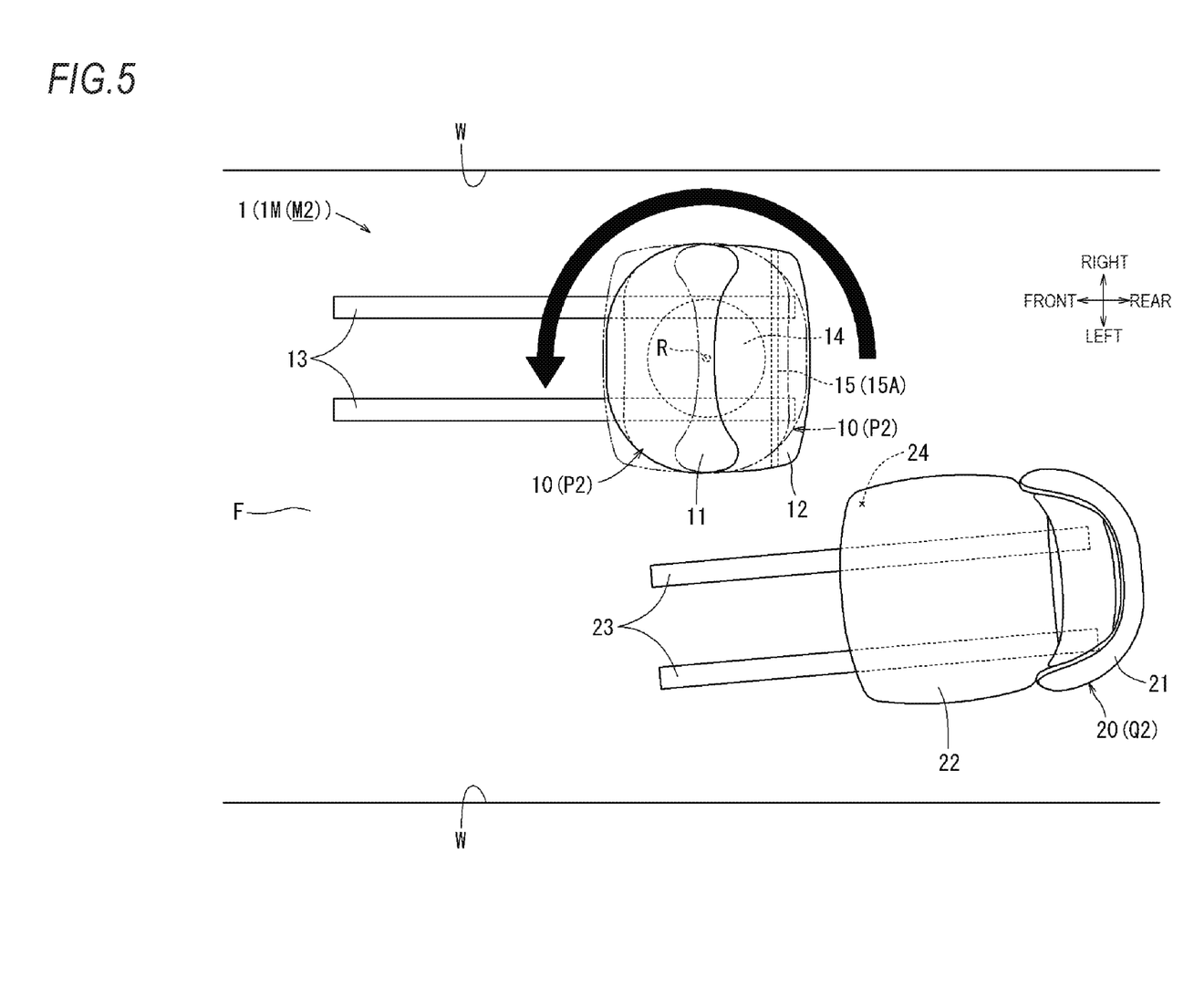
FIG. 5 is a plan view showing a state in which the first seat is switched to a vehicle rear-facing state from FIG. 4.

The seat structure 1 of the present embodiment includes a mode-switching mechanism 1M which is capable of switching an arrangement relationship between the right seat 10 and the left seat 20 provided in a two-seat automobile, between a lateral arrangement mode M1 in which occupants can be seated in a laterally arranged manner as shown in FIGS. 1 and 2 and a facing mode M2 in which the occupants can be seated facing each other in a front-rear direction as shown in FIG. 5. Here, the right seat 10 corresponds to the "first seat" of the present disclosure, and the left seat 20 corresponds to the "second seat" of the present disclosure.

Specifically, the mode-switching mechanism 1M is configured by a combination of an electric pivoting mechanism 14 provided to the right seat 10 and electrical slide rails 23 provided to the left seat 20. The pivoting mechanism 14 is configured to be capable of switching the right seat 10, via electric operation, from a vehicle front-facing state that straightly faces a front side of the vehicle as shown in FIG. 2 to a vehicle rear-facing state that substantially straightly faces a rear side of the vehicle (slightly toward an inner side) as shown in FIG. 5 by pivoting the right seat 10 leftward (toward the inner side of the vehicle) horizontally with respect to a floor F of the vehicle.

Figure 3:
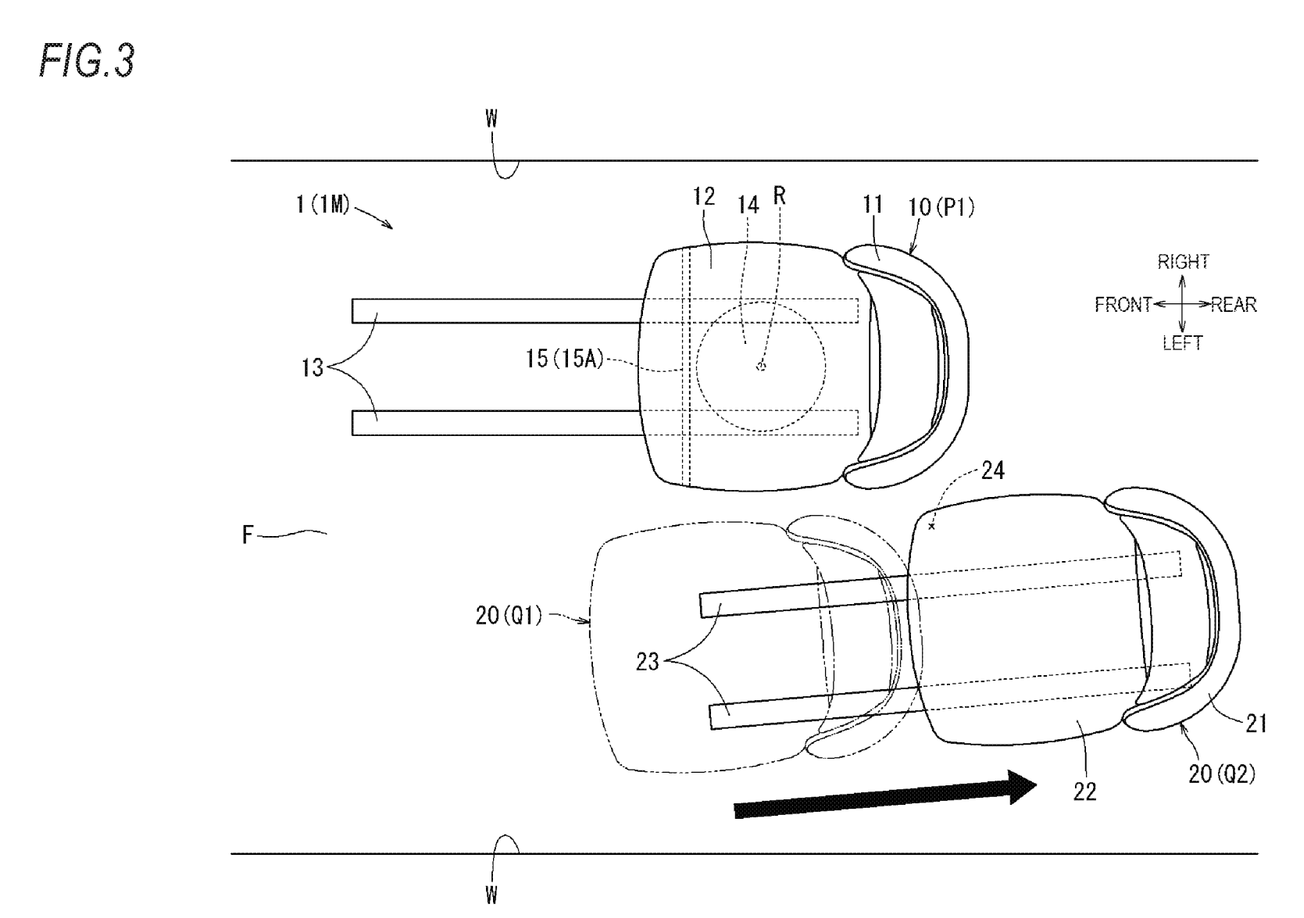
FIG. 3 is a plan view showing a state in which a second seat is retracted from FIG. 2 to a vertical arrangement position.

The slide rails 23 are configured to be capable of switching the left seat 20, via electric operation, from a state in a lateral arrangement position Q1 in which the left seat 20 is positioned in a manner arranged laterally with respect to the right seat 10 as shown in FIG. 2 to a state in a vertical arrangement position Q2 in which the left seat 20 is positioned in a manner arranged vertically with respect to the right seat 10 in the front-rear direction by sliding the left seat 20 along the floor F straightly toward a right rear side of the vehicle as shown in FIG. 3.

The right seat 10 and the left seat 20 are switched as follows from the state of the lateral arrangement mode M1 shown in FIG. 2 to the state of the facing mode M2 shown in FIG. 5 by the mode-switching mechanism 1M configured as described above. First, as shown in FIG. 2, from the state in which the right seat 10 and the left seat 20 are in the lateral arrangement mode M1, the left seat 20 is slid to the right rear side as shown in FIG. 3 to switch to the state of the vertical arrangement position Q2.

Next, the right seat 10 is pivoted to switch from the vehicle front-facing state shown in FIG. 3 to the vehicle rear-facing state shown in FIG. 5. As a result, the right seat 10 and the left seat 20 are switched to the facing mode M2 in which the occupants can be seated so as to face each other in the front-rear direction. Switching from the lateral arrangement mode M1 described above with reference to FIG. 2 to the facing mode M2 described above with reference to FIG. 5 may also be performed in a procedure of first switching the right seat 10 from the vehicle front-facing state to the vehicle rear-facing state and then moving the left seat 20 from the lateral arrangement position Q1 to the vertical arrangement position Q2.

As shown in FIG. 1, the right seat 10 described above is configured to have a seat back 11 serving as a backrest of a sitting occupant, a seat cushion 12 serving as a sitting portion, a pair of left and right electric slide rails 13 capable of adjusting a seat position of the right seat 10 in the front-rear direction with respect to the floor F, and a disk-shaped pivoting mechanism 14 capable of adjusting an installing direction of the right seat 10 with respect to the floor F by pivoting around a rotation center R.

The seat back 11 described above is connected to a rear end portion of the seat cushion 12 via an electric recliner (not shown) in a state in which a backrest angle can be adjusted. The seat cushion 12 is connected to the floor F with the disk-shaped pivoting mechanism 14 and the pair of left and right slide rails 13 provided therebetween in a state in which position adjustment in a pivoting direction and adjustment of the seat position in the front-rear direction of the vehicle can be performed. The pair of left and right slide rails 13 are provided in a state in which the right seat 10 can be slid straightly in the front-rear direction of the vehicle along the floor F.

Figure 8:
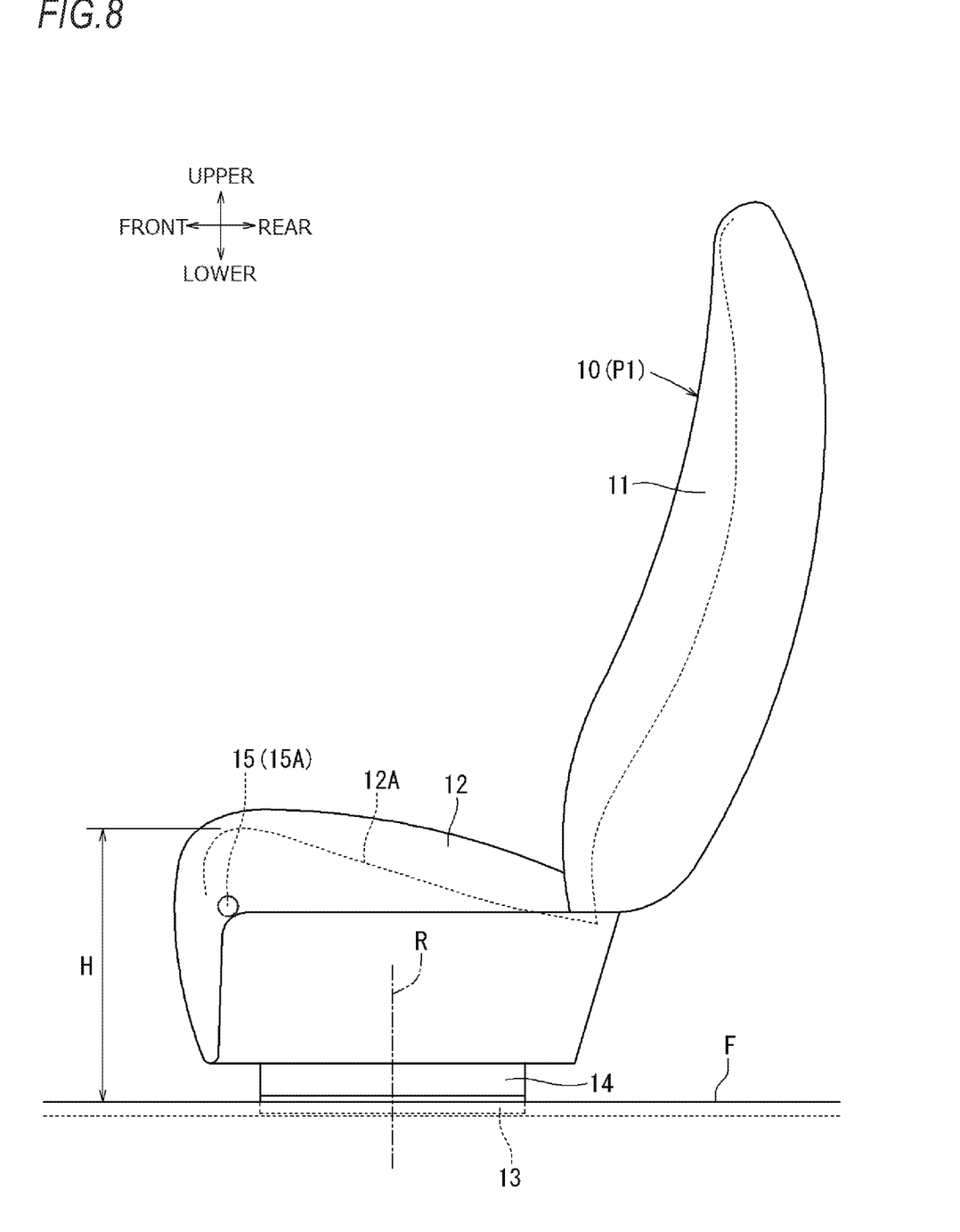
FIG. 8 is a side view showing a state of the first seat in a sitting position.
Figure 9:
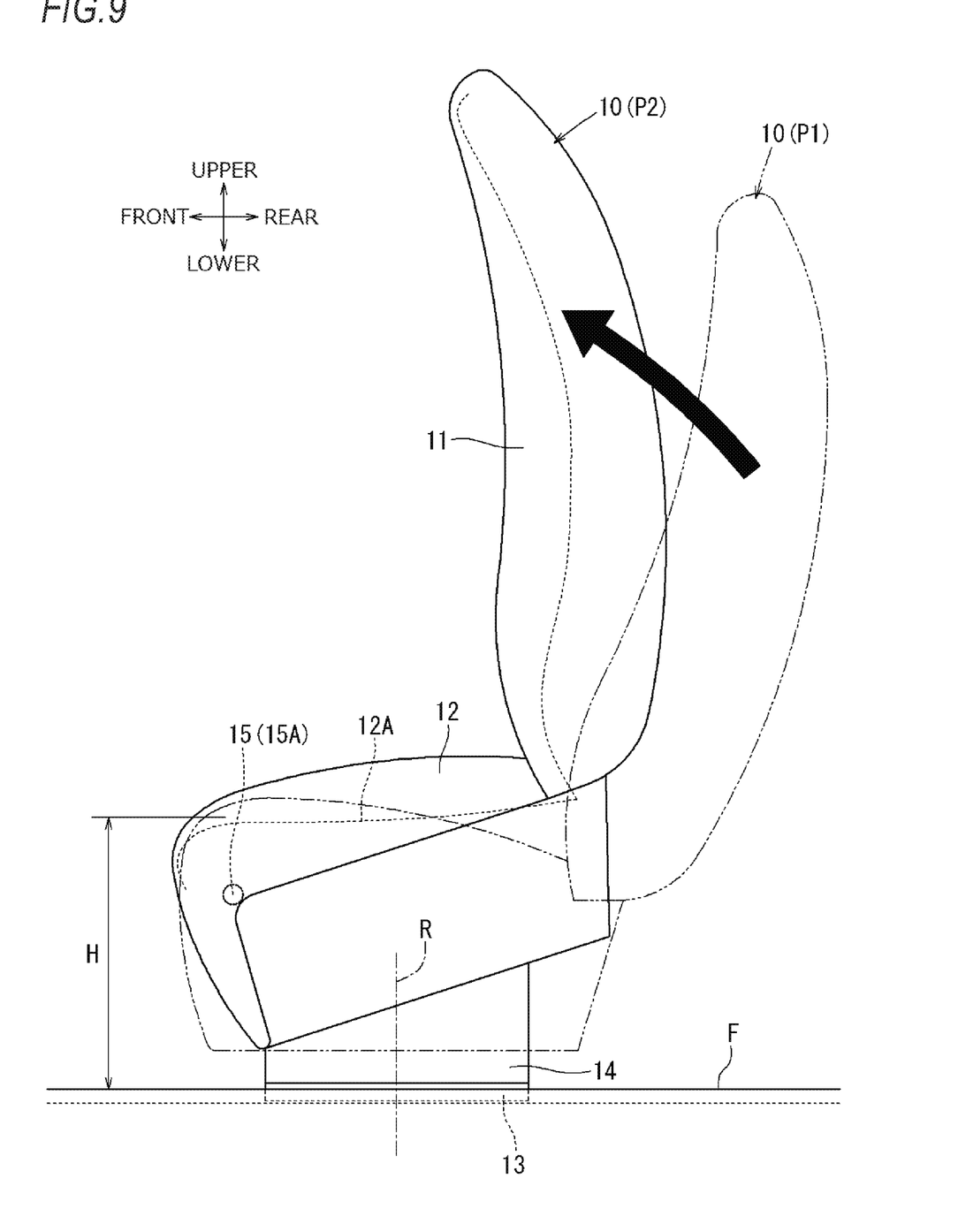
FIG. 9 is a side view showing a state in which the first seat is switched to the raised position.

The right seat 10 described above has an electric tilting rotation mechanism 15 capable of switching a sitting posture with respect to the floor F between a sitting position P1 in which the seat cushion 12 is laid down to the floor F and a normal sitting posture can be taken as shown in FIG. 8, and a raised position P2 in which the seat cushion 12 is raised from the sitting position P1 around a rotary hinge 15A set on a front portion thereof integrally with the seat back 11 from the floor F toward a seat front side as shown in FIG. 9.

Figure 4:
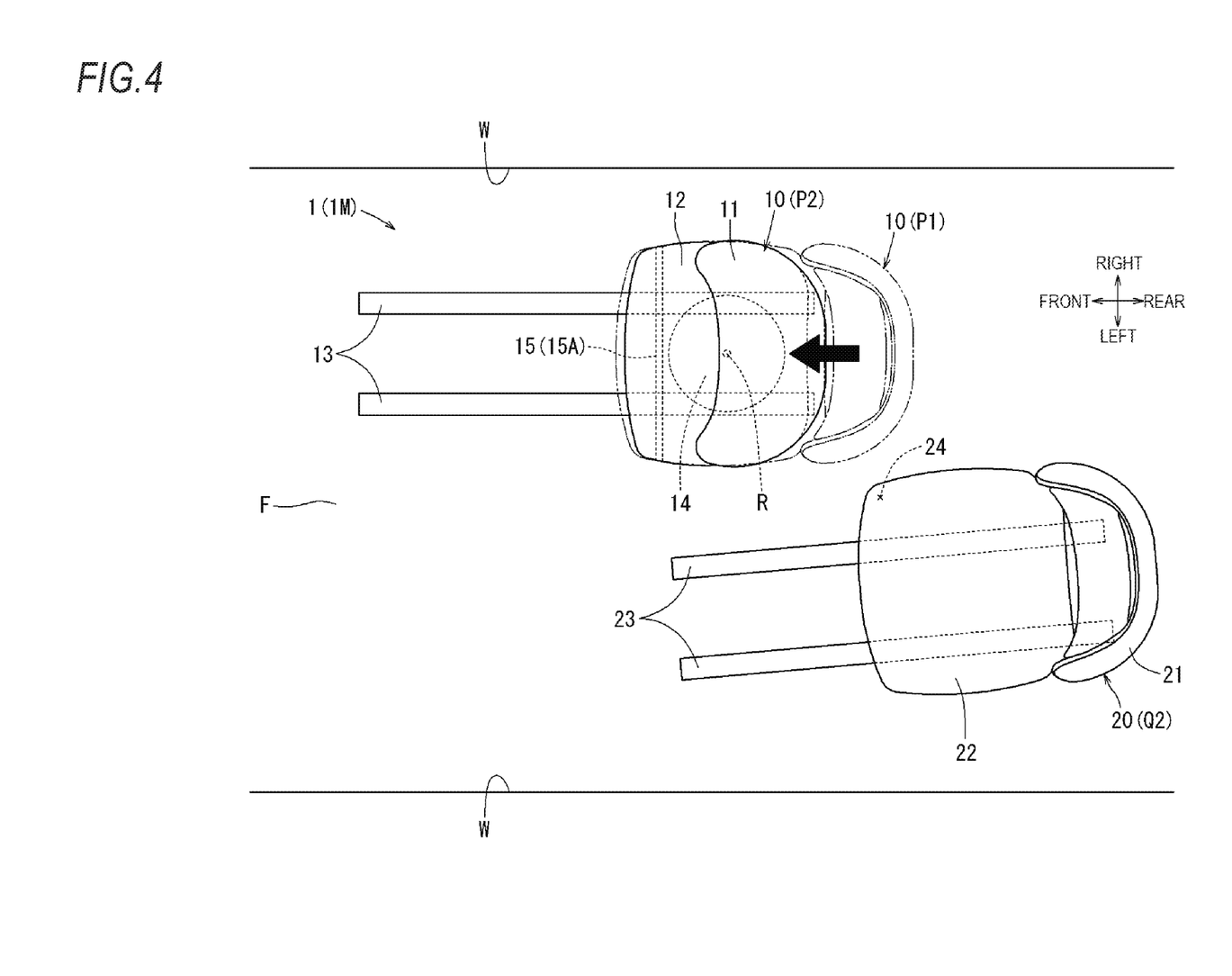
FIG. 4 is a plan view showing a state in which a first seat is switched to a raised position from FIG. 3.

When pivoting the right seat 10 described above toward the inner side of the vehicle from the vehicle front-facing state described above with reference to FIG. 3, in a case where a distance between the right seat 10 and a side wall W of the vehicle or the left seat 20 is too close, the tilting rotation mechanism 15 raises the right seat 10 from the sitting position P1 to the raised position P2, so as to reduce the pivoting radius of the right seat 10 around the rotation center R as shown in FIGS. 4 and 9, and to smoothly pivot the right seat 10 without interfering with the side wall W of the vehicle and the left seat 20 as shown in FIG. 5.

That is, in a state in the sitting position P1 in which the seat cushion 12 is laid down on the floor F as shown in FIG. 8, the right seat 10 described above is normally seated on with the seat back 11 at a raised angle slightly tilted rearward than an upright posture. Therefore, as shown in FIG. 3, depending on a slide position in the seat front-rear direction, when the right seat 10 described above is pivoted toward the inner side of the vehicle from the state at the sitting position P1 as described above, a problem occurs such that the seat back 11 tends to interfere with the side wall W of the vehicle (a tire house or the like which is not shown) due to increase of the pivoting radius caused by a rearward tilted posture of the seat back 11.

However, in the right seat 10 described above, as shown in FIGS. 4 and 9, when the seat cushion 12 and the seat back 11 are integrally switched from the state of the sitting position P1 to the state of the raised position P2 around the rotary hinge 15A by the tilting rotation mechanism 15 described above, the seat back 11 is raised forward and the pivoting radius around the rotation center R is reduced. As a result, as shown in FIG. 5, the right seat 10 can be smoothly pivoted toward the inner side of the vehicle without interference between the seat back 11 and the side wall W of the vehicle (a tire house or the like which is not shown). Therefore, since it is unnecessary to absorb a projecting shape due to rearward tilting of the seat back 11 by shifting the rotation center R of pivotation of the right seat 10 toward the rear side or the like, a problem such as the front portion of the seat cushion 12 being likely to interfere with the left seat 20 due to increase in the pivoting radius caused by shift of the rotation center R becomes unlikely to occur.

Figure 6:
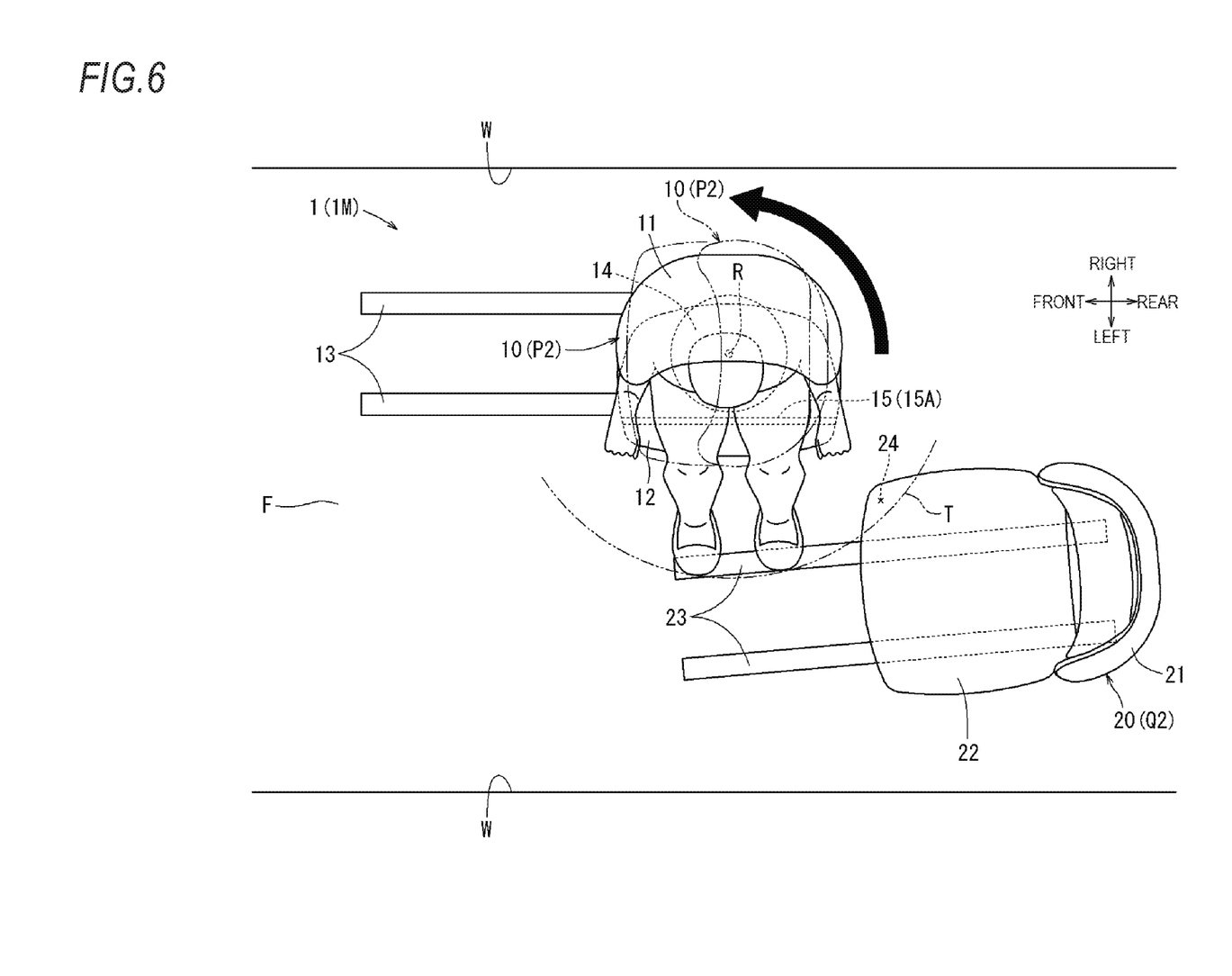
FIG. 6 is a plan view showing an arrangement relationship between a pivoting trajectory of the first seat in a raised position and the second seat.
Figure 7:
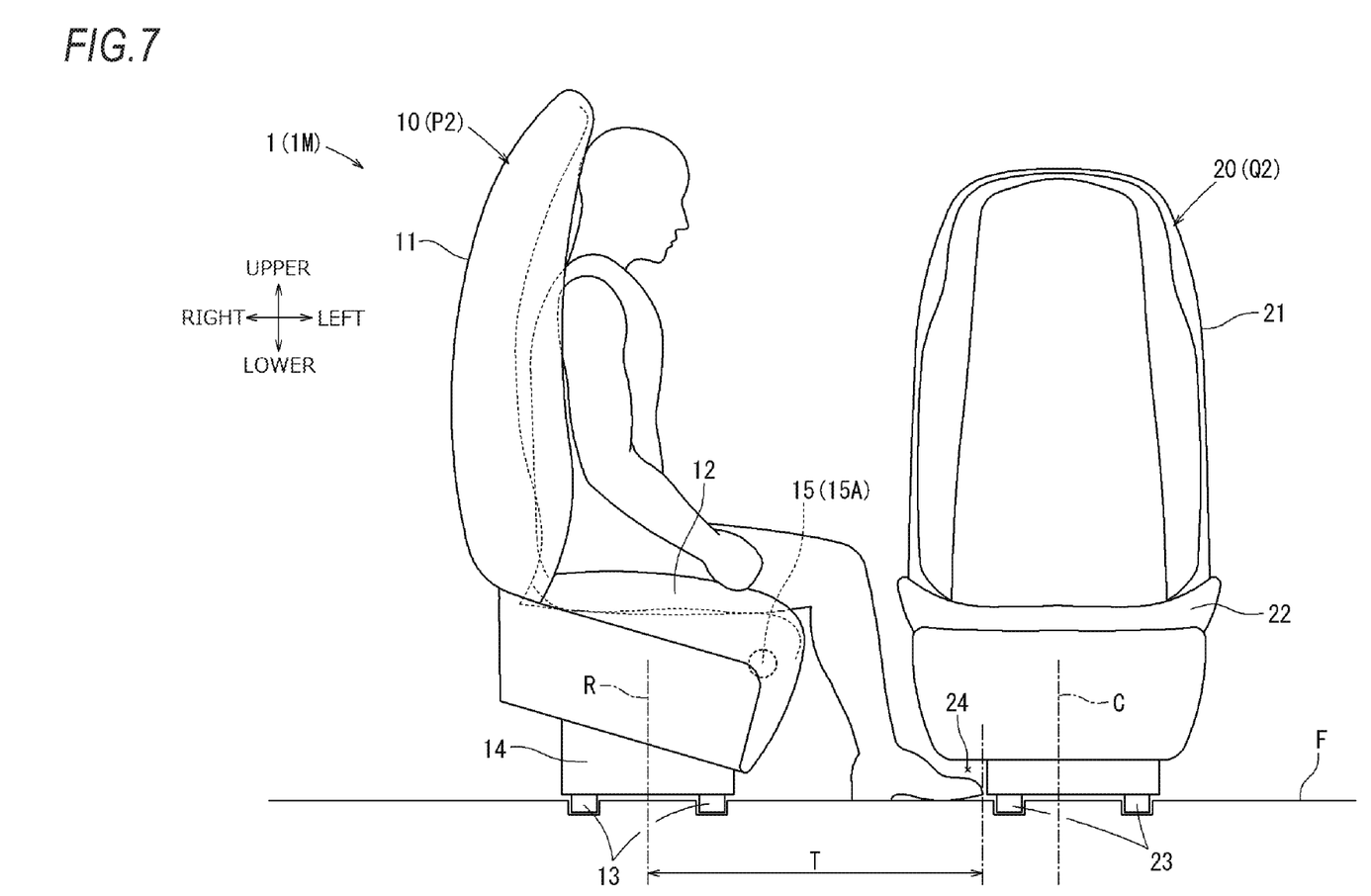
FIG. 7 is a front view of FIG. 6.

When the right seat 10 described above pivots toward the inner side of the vehicle from a state in which a distance thereof from the left seat 20 is too close as shown in FIG. 6, forefeet of the sitting occupant of the right seat 10 move in a movement trajectory overlapping with the left seat 20 in a plan view (pivoting radius of the forefeet: T (corresponding to the "pivoting trajectory of forefoot" of the present disclosure)). However, as shown in FIG. 7, a right area of the left seat 20 through which the forefeet of the sitting occupant of the right seat 10 (pivoting radius of the forefeet: T) pass is formed with a concave portion 24 capable of reducing interference between the left seat 20 and the forefeet of the sitting occupant of the right seat 10. Thus, even when the right seat 10 is pivoted toward the inner side of the vehicle from a position where the distance thereof from the left seat 20 is too close, the right seat 10 can be smoothly moved without interference between the left seat 20 and the forefeet of the sitting occupant of the right seat 10.

The left seat 20 described above is configured to have a seat back 21 serving as a backrest of a sitting occupant, a seat cushion 22 serving as a sitting portion, and a pair of left and right electric slide rails 23 capable of adjusting a seat position of the left seat 20 in the front-rear direction with respect to the floor F. The seat back 21 described above is connected to a rear end portion of the seat cushion 22 via an electric recliner (not shown) in a state in which a backrest angle can be adjusted. The seat cushion 22 is connected to the floor F with the pair of left and right slide rails 23 provided therebetween in a state in which adjustment of the seat position in the front-rear direction of the vehicle can be performed.

As shown in FIG. 7, the pair of left and right slide rails 23 described above are set to an offset arrangement in a manner shifted from a center position C of the seat cushion 22 in the seat width direction to the left side (the side away from the right seat 10), between the lower portion of the seat cushion 22 of the left seat 20 and the floor F. As a result, the concave portion 24 is formed as a concave area between a right side area of the seat cushion 22 and the floor F in accordance with the offset arrangement of the pair of left and right slide rails 23.

As shown in FIG. 8, the right seat 10 described above is configured such that the above-described pivoting mechanism 14 is provided between the pair of left and right slide rails 13 and the seat cushion 12. Further, the right seat 10 described above is configured such that the tilting rotation mechanism 15 described above is provided between the pivoting mechanism 14 and the seat cushion 12. As shown in FIG. 5, the pivoting mechanism 14 described above is configured to have the rotation center R at a substantially center position in a plan view of the seat cushion 12 of the right seat 10. As shown in FIG. 8, the tilting rotation mechanism 15 is configured to have the rotary hinge 15A extending in the seat width direction. The rotary hinge 15A is configured to switch the right seat 10 between the sitting position P1 and the raised position P2 shown in FIG. 9, and is located at a height position closer to the seat surface 12A of the seat cushion 12 of the right seat 10 than the floor F and at a position in an area in front of the center in the seat front-rear direction of the seat cushion 12.

According to the above configuration, the tilting rotation mechanism 15 can raise the right seat 10 from the state of the sitting position P1 shown in FIG. 8 to the state of the raised position P2 shown in FIG. 9 while suppressing fall of the seat surface 12A on the front side of the seat cushion 12. As a result, the height H from the seat surface 12A on the front side of the seat cushion 12 to the floor F does not greatly change even when the right seat 10 is switched to the raised position P2, so that the height space of the forefeet of the sitting occupant is unlikely to be narrowed, and a wide height space of the forefeet can be ensured when the right seat 10 is pivoted on the floor F as shown in FIG. 6.

By setting the position of the rotary hinge 15A of the tilting rotation mechanism 15 as described above with reference to FIG. 8, even if the right seat 10 is raised from the sitting position P1 shown in FIG. 8 to the raised position P2 shown in FIG. 9, the front portion of the seat cushion 12 does not largely project toward the seat front side, so that the right seat 10 can be rotated at a small pivoting radius. Therefore, at the time of pivoting the right seat 10 described above with reference to FIG. 5, the front portion of the seat cushion 12 of the right seat 10 is less likely to interfere with the left seat 20.

SUMMARY

In summary, the seat structure 1 of the present embodiment is configured as follows. That is, a vehicle seat structure (1) includes a first seat (10) and a second seat (20) which are disposed on a floor (F) of a vehicle. The first seat (10) includes: a tilting rotation mechanism (15) configured to connect the first seat (10) with respect to the floor (F) in a manner switchable between a sitting position (P1) on the floor (F) and a raised position (P2) raised from the sitting position (P1) toward a seat front side by rotation about an axis extending in a seat width direction; and a pivoting mechanism (14) configured to pivotably connect the first seat (10) to the floor (F) with the tilting rotation mechanism (15) provided therebetween.

The second seat (20) includes a concave portion (24) configured to reduce interference between the second seat (20) and a forefoot of a sitting occupant of the first seat (10) which is being pivoted at the raised position (P2) when the second seat (20) and the first seat (10) are in a positional relationship in which the second seat (20) overlaps, in a plan view, with a pivoting trajectory (T) of the forefoot of the sitting occupant of the first seat (10) which is being pivoted in the raised position (P2).

According to such configuration, by pivoting the first seat (10) switched to the raised position (P2), the first seat (10) can be pivoted on the floor (F) at a small rotation radius. In addition, due to the concave portion (24) formed on the second seat (20), it is possible to secure a wide space for the foot of the sitting occupant when the first seat (10) is pivoted.

The second seat (20) includes a pair of slide rails (23) capable of adjusting a seat position of the second seat (20) with respect to the floor (F). The pair of slide rails (23) are set to an offset arrangement in a manner shifted from a center position (C), in a direction in which the second seat (20) and the first seat (10) are arranged, of the second seat (20). The pair of slide rails (23) are shifted in a direction away from the first seat (10). The concave portion (24) is a concave area between the second seat (20) and the floor (F) formed by the offset arrangement of the pair of slide rails (23).

In this way, due to the configuration of the offset arrangement of the pair of slide rails (23) of the second seat (20), it is possible to form the concave portion (24) for reduce interference between the forefoot and the second seat (20) in a reasonable and effective shape.

The tilting rotation mechanism (15) has a rotary hinge (15A) configured to switch the first seat (10) between the sitting position (P1) and the raised position (P2). The rotary hinge (15A) is located at a height position closer to a seat surface (12A) of the seat cushion (12) than the floor (F) and at a position in front of a center in a seat front-rear direction of the seat cushion (12) in the first seat (10).

According to such configuration, it is possible to raise the first seat (10) to the raised position (P2) while reducing fall of the seat surface (12A) on the front side of the seat cushion (12). Therefore, it is possible to secure a wide height space for the foot when the first seat (10) is switched to the raised position (P2) and is pivoted on the floor (F).

OTHER EMBODIMENTS

Embodiments for carrying out the present disclosure have been described above with one embodiment as an example, but the present disclosure may be carried out in various modes other than the above example. For example, the configuration of the vehicle seat structure of the present disclosure may be widely applied to a seat structure used for a wheeled vehicle other than an automobile such as a train or vehicles such as an aircraft and a ship. The left-right or front-rear arrangement relationship between the first seat and the second seat may be opposite to the arrangement relationship shown in the embodiment.

The tilting rotation mechanism and the pivoting mechanism provided on the first seat may have a manual configuration. Further, the slide rails provided on the second seat may have a manual configuration. Further, the second seat may have a configuration without slide rails. In this case, the concave portion formed on the second seat may be configured such that a partial concave interference-reducing shape is formed on an area through which the forefeet of the sitting occupant of the first seat pass.

What is claimed is:

1. A vehicle seat structure comprising:

a first seat and a second seat which are disposed on a floor of a vehicle, wherein the first seat includes:

a tilting rotation mechanism configured to connect the first seat with respect to the floor in a manner switchable between a sitting position on the floor and a raised position raised from the sitting position toward a seat front side by rotation about an axis extending in a seat width direction; and a pivoting mechanism configured to pivotably connect the first seat to the floor with the tilting rotation mechanism provided therebetween, and wherein the second seat includes a concave portion configured to reduce interference between the second seat and a forefoot of a sitting occupant of the first seat which is being pivoted in the raised position when the second seat and the first seat are in a positional relationship in which the second seat overlaps, in a plan view, with a pivoting trajectory of the forefoot of the sitting occupant of the first seat being pivoted in the raised position.

2. The vehicle seat structure according to claim 1, wherein the second seat includes a pair of slide rails capable of adjusting a seat position of the second seat with respect to the floor, wherein the pair of slide rails are set to an offset arrangement in a manner shifted from a center position of the second seat, in a width direction of the second, seat, the pair of slide rails being offset from the center position of the second seat in a direction away from the first seat, and wherein the concave portion is a concave area between the second seat and the floor formed by the offset arrangement of the pair of slide rails.

3. The vehicle seat structure according to claim 1, wherein the tilting rotation mechanism includes a rotary hinge configured to switch the first seat between the sitting position and the raised position, the rotary hinge being located at a height position closer to a seat surface of a seat cushion of the first seat than the floor and at a position in front of a center in a seat front-rear direction of the seat cushion.

* * * * *